(12) United States Patent
Hirano et al.

(10) Patent No.: US 7,649,204 B2
(45) Date of Patent: Jan. 19, 2010

(54) IMAGE DISPLAY MEDIUM

(75) Inventors: Atsushi Hirano, Kanagawa (JP);
Yasufumi Suwabe, Kanagawa (JP);
Yoshinori Machida, Kanagawa (JP);
Yoshiro Yamaguchi, Kanagawa (JP);
Takeshi Matsunaga, Kanagawa (JP);
Kiyoshi Shigehiro, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 329 days.

(21) Appl. No.: 11/522,919

(22) Filed: Sep. 19, 2006

(65) Prior Publication Data
US 2007/0210308 A1    Sep. 13, 2007

(30) Foreign Application Priority Data
Mar. 7, 2006   (JP)   ............................. 2006-061432

(51) Int. Cl.
*H01L 29/04*    (2006.01)

(52) U.S. Cl. .................................... 257/59; 257/E27.06
(58) Field of Classification Search .................. 257/59, 257/72, E27.06; 345/98, 92–93, 107; 349/96
See application file for complete search history.

(56) References Cited

U.S. PATENT DOCUMENTS

| 4,876,165 A | * | 10/1989 | Brewer et al. .................. 430/7 |
| 6,750,843 B2 | | 6/2004 | Sakamaki et al. |

* cited by examiner

*Primary Examiner*—Davienne Monbleau
*Assistant Examiner*—Hoa B Trinh
(74) *Attorney, Agent, or Firm*—Oliff & Berridge, PLC

(57) ABSTRACT

An image display medium includes: a first substrate; a second substrate facing the first substrate; a first bonding layer provided inside at least one of the first substrate and the second substrate; and an insulating layer fixed to the at least one of the first substrate and the second substrate by the first bonding layer, wherein the first bonding layer has a Young's modulus smaller than the substrate formed with the insulating layer and the insulating layer.

12 Claims, 2 Drawing Sheets

IMAGE DISPLAY MEDIUM

BACKGROUND

1. Technical Field

This invention relates to an image display medium having flexibility and in particular to an image display medium having an insulating film inside a substrate.

2. Related Art

Hitherto, an image display medium for displaying an image using charged toner particles of two colors has been available as an image display medium having flexibility such as electronic paper.

The image display medium includes a pair of substrates placed facing each other, a spacer sandwiched between the pair of substrates, and first and second particles different in color and electronic characteristic, filled into internal space between the substrate and the spacer.

According to the image display medium, a dielectric film is provided inside the substrate, whereby damage to the substrate caused by collision of the particles and leakage of charges charged to the particles are suppressed for preventing degradation of the image display characteristic.

According to the image display medium, however, to sufficiently suppress the damage to the substrate caused by collision of the particles and the leakage of charges charged to the particles, the dielectric film needs to have a measure of thickness and as the thickness of the dielectric film increases, when bending deformation of the image display medium is performed, etc., it becomes impossible to follow the deformation, causing peeling to occur; this is a problem.

SUMMARY

According to an aspect of the present invention, an image display medium comprising: a first substrate; a second substrate facing the first substrate; a first bonding layer provided inside at least one of the first substrate and the second substrate; and an insulating layer fixed to the at least one of the first substrate and the second substrate by the first bonding layer, wherein the first bonding layer has a Young's modulus smaller than the substrate formed with the insulating layer and the insulating layer.

According to the aspect of the invention, the insulating layer is formed through the first bonding layer having a Young's modulus smaller than the substrate formed with the insulating layer and the insulating layer, whereby if the insulating layer has a thickness to secure a sufficient insulating property, when the insulating layer is sufficiently bonded to the substrate and bending deformation, etc., is added, peeling does not occur.

It is preferred that the image display medium is an electronic paper of optical write type, toner display type, electrophoresis, etc., for example, particularly on electronic paper with the insulating film requiring a measure of thickness, such as toner display.

The first and second electrodes have a form wherein both are full-face electrodes, a form wherein one is full-face electrode and the other is pixel electrode, a form wherein one is scan electrode and the other is signal electrode, a form wherein one is signal electrode and the other is line electrode for scanning as moving on the signal electrode, etc., for example, depending on the type of image display medium.

a coat layer is formed inside the at least one of the first substrate and the second substrate, and covering at least one of the first electrode and the second electrodes. Accordingly, the first and second electrodes can be protected and a wire break can be prevented. To use a composite polymer with inorganic particles dispersed as the coat layer, the residual stress of the coat layer is suppressed, whereby warpage of plastic film can be prevented and the hygroscopicity of the coat layer is decreased, whereby occurrence of crack of the transparent electrode caused by wrinkles occurring on the coat layer, etc., can be prevented.

The insulating layer has a thickness of 300 nm or more, and 30 μm or less. If the insulating layer has a thickness of 300 nm or more, it is preferable for ensuring an insulating property. If the layer is thick, the image force lowers and thus it is also preferable for preventing a burn error of display media. If the insulating layer has a thickness of 30 μm or less, it is preferable for circumventing the following problem: Because of excessive thickness, the electrode-to-electrode distance becomes long, the space volume required for obtaining a given electric field strength decreases, and flocculation of particles easily occurs.

Preferably, the insulating layer has predetermined hardness to prevent a display failure caused by an increase in the adhesive force with drive particles. If the hardness is too low, it is feared that the contact area with particles may increase because of deformation, causing the adhesive force to increase more than necessary.

The first bonding layer has a Young's modulus of 5000 kg/cm$^2$ or less. The first bonding layer may have a light transmittance of 90% or more, and saturation C* of 1 or less. The saturation C* represents the distance from the origin of an a*b* chromaticity diagram in an L*a*b* calorimetric system; the larger the value, the larger the distance from achromatic color. Almost achromatic color where C* is of 1 or less.

The partition members can use an insulating material. The partition members may be fixed by fusion with the insulating layer. In this case, bonding can be executed without using any adhesive.

The particles may be made up of particles of two types or more different in color and charge characteristic. For example, they are mixed particles of white and black particles, which charge to different polarities by frictional electrification caused by mutual friction.

A second bonding layer bonding the partition member to one of the first substrate and the second substrate, and the partition members are directly bonded to the other substrate.

The image display medium comprises an insulating film, and the insulating layer is formed inside one of the first substrate and the second substrate, the partition members are formed on the other substrate opposite to the one substrate formed with the insulating layer, and the insulating film covers the partition member and the one substrate formed with the partition member.

The insulating film is formed by dip coating a resin solution.

The partition member is fixed to the insulating layer by the second bonding layer. The partition members may be provided integrally by means of fusion, etc., with the insulating layer.

BRIEF DESCRIPTION OF THE DRAWINGS

Exemplary embodiments of the present invention will be described in detail based on the following figures, wherein.

DETAILED DESCRIPTION

First Embodiment (General Configuration)

Figure 1:
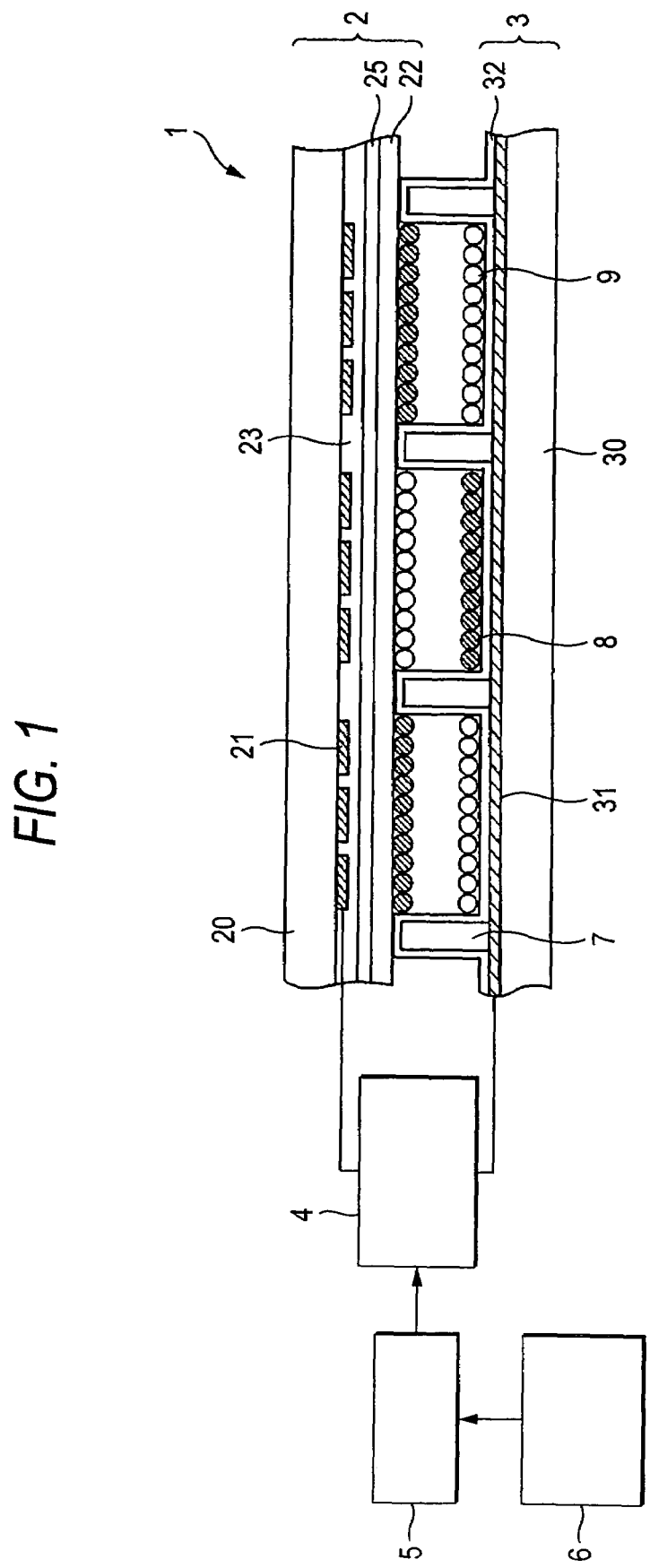
FIG. 1 is a drawing to show the configuration of an image display medium according to a first embodiment of the invention.

FIG. 1 is a drawing to show the configuration of an image display medium 1 according to a first embodiment of the invention. This image display medium 1 displays an image with particles filled between two substrates and is roughly made up of a surface substrate 2 and a back substrate 3 placed facing each other with partition members 7 between, and first and second particles 8 and 9 filled into each gap partitioned by the partition members 7.

The first and second particles 8 and 9 have different colors and charge to different polarities by frictional electrification caused by mutual friction. For example, if the first and second particles 8 and 9 are white particles and black particles, the white particles can use resin containing titanium oxide, zinc oxide, tin oxide, etc., and the black particles can use resin containing carbon black, manganese ferrite black, titanium black, etc.

The surface substrate 2 has a surface support substrate 20, a coat layer 23 formed by embedding first electrodes 21 on the surface support substrate 20, and an insulating layer 22 formed on the coat layer 23 via a first bonding layer 25.

The back substrate 3 has a back support substrate 30 and second electrodes 31 formed on the back support substrate 30.

The surface support substrate 20 and the back support substrate 30 can use a glass substrate, a transparent resin film or transparent resin sheet of PET (polyethylene terephthalate), PC (polycarbonate), PES (polyethersulfone), acrylic, etc., epoxy-family resin, etc., for example. Since the surface support substrate 20 is positioned on the display side, preferably a material having a high light transmission property is used.

The first electrodes 21 and the second electrodes 31 can use single-layer film, mix film, or composite film of oxide of ITO (indium tin oxide), IZO (indium zinc oxide), indium, tin, cadmium, antimony, etc., and composite oxide thereof, gold, silver, copper, carbon, nickel, etc., having translucency with a thickness of 100 to 2000 angstroms using a vapor deposition method or a sputtering method or organic conductive material, etc., of polypyrrole, polythiophene, etc. Since the first electrodes 21 are positioned on the display side, preferably a material having a high light transmission property is used.

The first electrodes 21 and the second electrodes 31 are column electrodes, row electrodes orthogonal to each other, for example, and form matrix electrodes.

The coat layer 23 is made of acrylic-based polymeric resin.

The first bonding layer 25 bonds the coat layer 23 and the insulating layer 22 and has a Young's modulus smaller than the surface support substrate 20 and the insulating layer 22. Accordingly, when bending deformation of the image display medium 1 is performed, the first bonding layer 25 works as a buffer material and if the insulating layer 22 has a measure of thickness, the deformation of the surface support substrate 20 can be followed without causing peeling to occur.

The representative Young's moduli of PC, PET, and PES mainly used as the materials of the surface support substrate 20 and the insulating layer 22 are 25000, 100000, and 20000 kg/cm$^2$ respectively. Therefore, the Young's modulus of the material of the first bonding layer 25 is preferably 20000 kg/cm$^2$ or less; more preferably 5000 kg/cm$^2$ or less. Preferably, the tensile bonding force is 50 kg/cm$^2$ or more.

The first bonding layer 25 is made of UV curable resin, for example.

The insulating layer 22 has a thickness of 300 nm to 30 μm and can use PET, PC, PES, polyester, polyimide, epoxy, polyisocyanate, polyamide, polyvinyl alcohol, polybutadiene, polymethyl methacrylate, copolymer nylon, UV curable acrylic resin, amorphous Teflon (registered trademark), etc. Although an inorganic material may be used, generally an organic material is preferred to the inorganic material because bending is easily followed if a thickness is provided. To improve the display image quality of the image display medium 1, a material with light transmittance 90% or more and saturation $C^* \leq 1$ is preferable.

The partition members 7 are formed on the back substrate 3 and an insulating film 32 is formed so as to cover the surfaces of the partition members 7 and the back substrate 3.

The partition members 7 are made of an insulating material of thermoplastic resin, thermoset resin, electron radiation curable resin, photo-curable resin, rubber, etc., for example.

The insulating film 32 is formed by dip coating a solution provided by dissolving polycarbonate resin into monochrome benzene, for example.

A voltage application section 4 for applying a voltage to the image display medium 1 is connected to the first and second electrodes 21 and 31, a control section 5 for controlling the voltage application section 4 is connected to the voltage application section 4, and an image storage section 6 for storing an image displayed on the image display medium 1 is connected to the control section 5.

The control section 5 is made up of a CPU, ROM, RAM, an HDD, etc., and the CPU performs write control onto the image display medium 1 at the image writing time in accordance with programs stored in the ROM, the HDD, etc.

The image storage section 6 is implemented as an HDD, etc., and stores display images to be displayed on the image display medium 1. The display image may be input to the image storage section 6 through a record medium of a CD-ROM, etc., or a network.

In the embodiment, one cell contains plural pixels, but one cell may form one pixel. Here, the expression "one pixel" is used to mean an area where the column electrode 21 and the row electrode cross.

(Advantages of First Embodiment)

According to the first embodiment, the following advantages are provided:

(a) As the insulating layer 22 is formed through the first bonding layer 25 having a Young's modulus smaller than the surface support substrate 20 and the insulating layer 22, if the insulating layer 22 has a thickness to secure a sufficient insulating property, when bending deformation, etc., is added, the first bonding layer works as a buffer material and it is made possible for the insulating layer 22 to flexibly follow the deformation of the surface support substrate 20, so that peeling does not occur.

(b) The insulating layer 22 is thickened, whereby occurrence of pinholes of the insulating layer 22 caused by collision of the first and second particles 8 and 9 can be suppressed and a display failure of the image display medium 1 caused by lowering of the charge amounts of the first and second particles 8 and 9 can be prevented.

Second Embodiment

Figure 2:
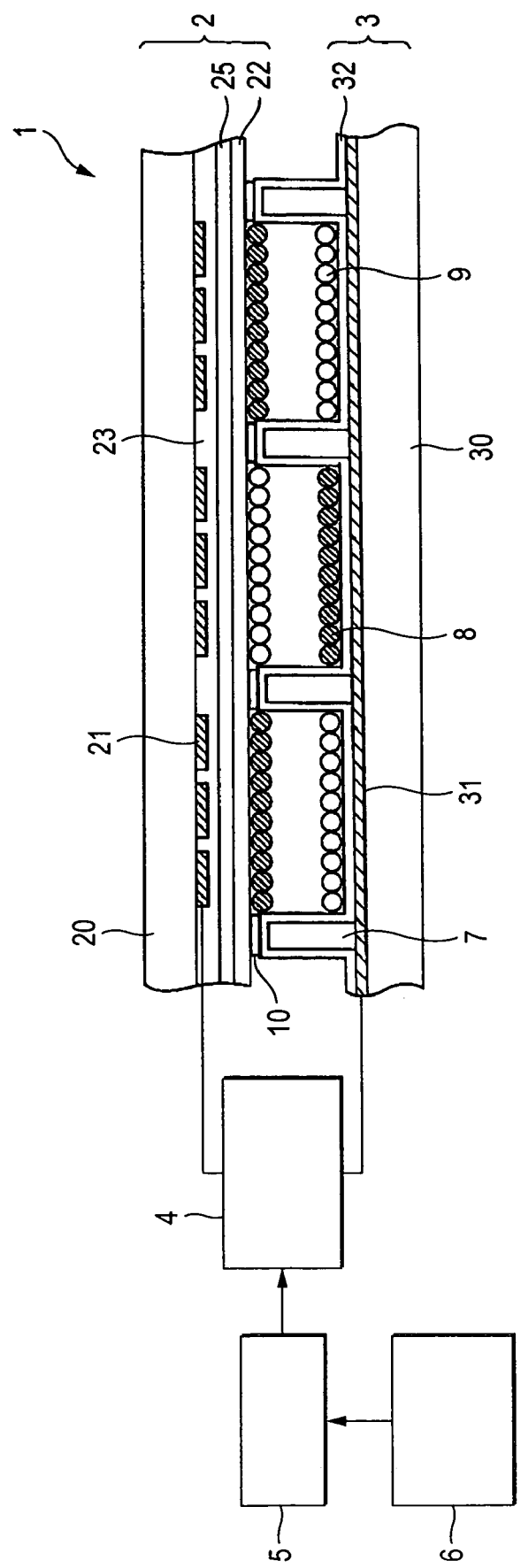
FIG. 2 is a drawing to show the configuration of an image display medium according to a second embodiment of the invention.

FIG. 2 is a drawing to show the configuration of an image display medium according to a second embodiment of the invention. In the second embodiment, a second bonding layer 10 is formed between partition members 7 coated with an insulating film 32 and an insulating layer 22. Since the second bonding layer 10 is formed according to a print process, preferably it has viscosity to allow printing and a quick drying property to prevent deposition of particles. Other components are similar to those of the first embodiment.

(Advantages of Second Embodiment)

According to the second embodiment, when the partition members 7 and the insulating layer 22 are bonded by the second bonding layer 10, peeling occurring between the partition members 7 and the insulating layer 22 can be prevented.

Other Embodiments

It is to be understood that the invention is not limited to the specific embodiments thereof described above and various modifications and changes can be made without departing from the spirit and the scope of the invention.

For example, in the description of the embodiments, the first and second particles 8 and 9 are charged by friction, but the invention is not limited to the mode.

In the description of the embodiments, the image display medium 1 is a toner display, but may be any other type of image display medium for displaying an image with particles.

In the description of the embodiments, the image display medium 1 produces monochrome binary display, but may be an image display medium for producing ternary or more gray-scale display or color display.

In the description of the embodiments, the surface substrate 2 is made up of the coat layer 23, the first bonding layer 25, and the insulating layer 22, but the back substrate 3 may have the components or both the surface substrate 2 and the back substrate 3 may have the components.

In the description of the embodiments, the insulating film 32 covers the surfaces of the partition members 7 and the back substrate 3, but may cover only the back substrate 3.

The components of the embodiments described above can be combined as desired without departing from the spirit and the scope of the invention.

The invention will be discussed below specifically with examples, but is not limited by the examples:

FIRST EXAMPLE

In a first example, four types of image display media 1 each having a similar configuration to that in the first embodiment were manufactured by changing the thickness of the insulating layer 22, and the charge amount of the mixed particles of white and black particles and the display density of each image display medium 1 were evaluated.

The thicknesses of the insulating layers 22 of the four types of image display media 1 were 0 (no insulating layer), 77 nm, 380 nm, and 1900 nm. Other components were common to the four types of image display media 1. The height of the partition member 7 was 200 μm, the thicknesses of the insulating film 32 was 1000 nm, and the diameter of a white particle charged negatively and the diameter of a black particle charged positively were each about 10 μm.

Transparent and colorless UV curable resin with tensile bonding force 80 kg/cm$^2$ and Young's modulus 100 kg/cm$^2$ was used as the first bonding layer 25. For the UV curable resin, curing ultraviolet irradiation amount was 500 mj/cm$^2$ and ultraviolet irradiation was executed for about 40 minutes with strength of 15 mj/cm$^2$/1 min, thereby curing.

The size of each image display medium 1 was 20 mm×20 mm and 8.6-mg white particles and black particles were dispersed uniformly in the image display medium 1 as the first and second particles 8 and 9.

(Evaluation)

±250-V alternate voltage was applied to the four types of image display media 1, the first and second particles 8 and 9 were dispersed uniformly in cells, and a state in which white particles or black particles move to the display surface is created and then the voltage application was stopped and the magnitudes of the flowing currents were measured at three timings of just after the state was created, one day after, and eight days after. Then, the move components of the mixed particles were calculated from the measured current values and were converted into charge amounts.

Table 1 lists change in the charge amounts of the mixed particles just after the experiment started, one day after, and eight days after in the four types of image display media 1. It is seen that the thicker the insulating layers 22, the larger the charge amount of the first and second particles 8 and 9 at every timing.

TABLE 1

| Film thickness | Charge amount (nC) | | |
|---|---|---|---|
| (nm) | just after start | one day after | eight days after |
| 0 | 3.103533 | 2.686267 | 2.114212 |
| 77 | 4.934521 | 4.581231 | 3.937495 |
| 380 | 5.209665 | 4.742162 | 3.949126 |
| 1900 | 5.617188 | 5.329077 | 4.587042 |

Table 2 lists reflection densities of white display and black display measured eight days after manufacturing in the four types of image display media 1. Here, the smaller the value of the reflection density, the higher the density of white display; the larger the value, the higher the density of black display. The contrast is a value represented by $10^{(B-W)}$ where the white reflection density is W and the black reflection density is B. From the result, it is seen that as the insulating layers 22 becomes thicker, the display densities of white display and black display tend to become higher and the contrast improves.

TABLE 2

| Film thickness (nm) | White reflection density | Black reflection density | Contrast |
|---|---|---|---|
| 0 | 0.53 | 1.42 | 7.762471 |
| 77 | 0.51 | 1.45 | 8.709636 |
| 380 | 0.5 | 1.49 | 9.772372 |
| 1900 | 0.48 | 1.58 | 12.58925 |

It is considered that the results listed in Tables 1 and 2 are produced because as the insulting layer is thicker, it is more resistant to shock caused by collision of particles and is not degraded in insulating property from damage. On the other hand, it is considered that the thinner medium is degraded in insulating property and particle charges leak to the electrode side.

SECOND EXAMPLE

In a second example, an image display medium 1 having a similar configuration to that of the second embodiment was manufactured and ease of peeling of second boding layer when an external force is applied was evaluated.

The second bonding layer 10 was formed by techno alpha STAYSTIC 371 (manufactured by Techno alpha; die shear 168 kg/cm$^2$ elasticity modulus 4200 kg/cm$^2$).

As a control example, an image display medium with a second bonding layer formed by STAYSTIC 343 (manufactured by Techno alpha; die shear 70 kg/cm$^2$ elasticity modulus 28000 kg/cm$^2$) was provided and was also evaluated.

(Evaluation)

The image display medium 1 was pressed against a side of a rod measuring 50 mm in diameter and the presence or absence of occurrence of peeling of the bonding layer was tested.

As a result, peeling occurred in the control example, but did not occurred in the image display medium according to the second example. The elasticity modulus has a close relationship with the Young's modulus of an elongation modulus and it is considered that peeling occurred in the control example because the elasticity modulus was large in the control example.

What is claimed is:

1. An image display medium comprising:
   a first substrate;
   a second substrate facing the first substrate;
   a first bonding layer provided inside the first substrate;
   a first electrode having sides formed on an inner surface of the first substrate;
   a second electrode formed on an inner surface of the second substrate;
   an insulating layer fixed to the first substrate by the first bonding layer; and
   a coat layer formed inside the first substrate, and covering the first electrode including the sides of the first electrode,
   wherein
   the first bonding layer has a Young's modulus smaller than the first substrate and the insulating layer, and is provided between the first substrate and the insulating layer.

2. The image display medium as claimed in claim 1, which comprises:
   a partition member partitioning a gap between the first substrate and the second substrate; and
   particles filled into the gap partitioned by the partition member.

3. The image display medium as claimed in claim 2, which comprises:
   a second bonding layer bonding the partition member to the first substrate,
   wherein
   the partition member is bonded to the second substrate.

4. The image display medium as claimed in claim 2, further comprising:
   an insulating film,
   wherein
   the insulating film is formed inside the second substrate,
   the partition member is formed on the second substrate, and
   the insulating film covers the partition member and the second substrate.

5. The image display medium as claimed in claim 3, wherein at least one of the partition members is fixed to the insulating layer by the second bonding layer.

6. The image display medium as claimed in claim 1, wherein the first bonding layer has a Young's modulus of 5000 kg/cm2 or less.

7. The image display medium as claimed in claim 1, wherein the first bonding layer has light transmittance of 90% or more, and saturation of 1 or less.

8. The image display medium as claimed in claim 1, wherein the insulating layer has a thickness of 300 nm or more, and 30 mm or less.

9. The image display medium as claimed in claim 1, wherein the insulating layer has a light transmittance of 90% or more, and a saturation of 1 or less.

10. The image display medium as claimed in claim 3, wherein the second bonding layer has a Young's modulus smaller than the insulating layer bonded by the second bonding layer.

11. The image display medium as claimed in claim 3, wherein the second bonding layer has an elasticity modulus of 5000 kg/cm2 or less.

12. An image display medium comprising:
    a first substrate;
    a second substrate facing the first substrate;
    a first bonding layer provided inside the first substrate;
    a first electrode having sides formed on inner surface of the first substrate;
    a second electrode formed on inner surface of the second substrate;
    an insulating layer fixed to the first substrate by the first bonding layer;
    a coat layer formed inside the first substrate, and covering the first electrode including the sides of the first electrode; and
    a partition member partitioning a gap between the first substrate and the second substrate, the partition member being covered in an insulating film,
    wherein
    the first bonding layer has a Young's modulus smaller than the first substrate and the insulating layer, and is provided between the first substrate and the insulating layer, and
    the partition member is fixed to the insulating layer by the second bonding layer.

* * * * *